United States Patent [19]
Wisner et al.

[11] Patent Number: 5,653,506
[45] Date of Patent: Aug. 5, 1997

[54] AUTOMOTIVE SEAT RECLINER INTERLOCK

[75] Inventors: Donald W. Wisner, Grand Haven; Erik J. Denslow, Spring Lake, both of Mich.

[73] Assignee: Track Corp., Grand Haven, Mich.

[21] Appl. No.: 519,632

[22] Filed: Aug. 25, 1995

[51] Int. Cl.⁶ .................................................. A47C 1/02
[52] U.S. Cl. .................. 297/344.1; 297/473; 297/216.1; 297/463.1; 248/429; 248/503.1
[58] Field of Search .............................. 297/344.1, 473, 297/463.1, 216.1, 216.18; 248/419, 429, 393, 503.1

[56] References Cited

U.S. PATENT DOCUMENTS

| | | | |
|---|---|---|---|
| 4,209,159 | 6/1980 | Becker et al. | 297/344.1 X |
| 4,262,963 | 4/1981 | Bauer et al. | 297/473 |
| 4,526,424 | 7/1985 | Korth | 297/473 |
| 4,673,217 | 6/1987 | Nishiyama et al. | 297/473 |
| 4,784,434 | 11/1988 | Iwami | 248/429 X |
| 4,818,022 | 4/1989 | Nishimura | 297/473 |
| 5,137,244 | 8/1992 | Negi | 248/429 X |
| 5,322,348 | 6/1994 | Johnson et al. | 297/473 |
| 5,362,132 | 11/1994 | Griswold et al. | 297/344.1 X |

*Primary Examiner*—Peter M. Cuomo
*Assistant Examiner*—Rodney B. White
*Attorney, Agent, or Firm*—Warner Norcross & Judd

[57] ABSTRACT

An automotive seat assembly including a recliner interlock reducing the likelihood that the recliner will break away from the remainder of the seat assembly in a collision. The seat assembly includes a base having a pedestal and a rail mechanism, a seat frame including a seat pan and a seat back interconnected by the recliner, and a recliner interlock for mechanically securing the recliner to the seat base. The interlock includes a J-shaped retainer secured to the recliner and an inverted J-shaped track secured to the pedestal. The retainer and track slidably interfit with one another to allow the recliner retainer to move along the pedestal track when the seat is moved forward and backward.

17 Claims, 4 Drawing Sheets

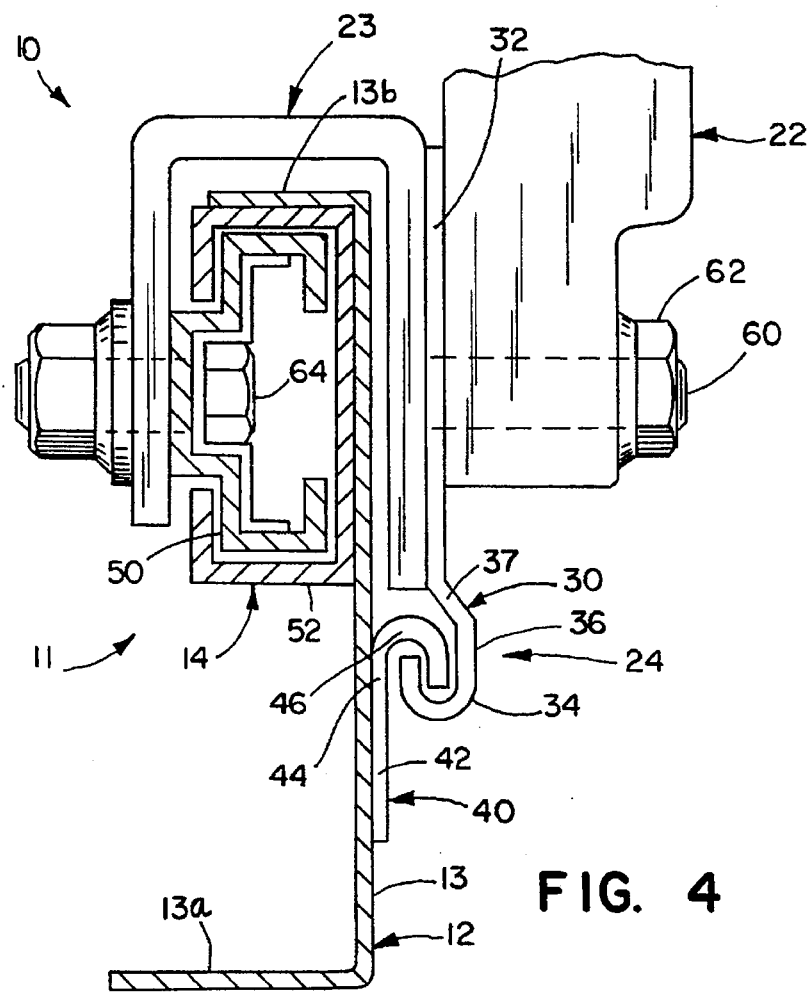
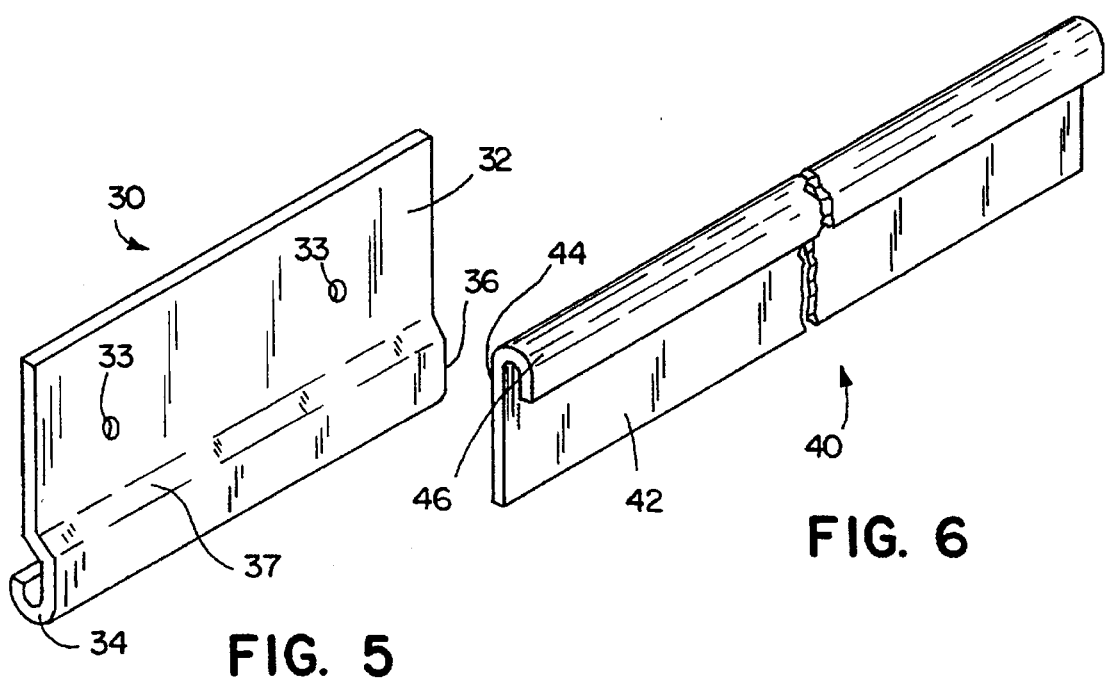

AUTOMOTIVE SEAT RECLINER INTERLOCK

BACKGROUND OF THE INVENTION

The present invention relates to automotive seating, and more particularly to a mechanism for restricting movement of a reclining automotive seat back in a collision.

An automotive seat assembly includes a seat frame mounted on a rail mechanism to allow forward and backward movement of the seat. In sedans and other relatively low profile vehicles, the rail mechanism is secured directly to the floor of the vehicle. In higher profile vehicles, such as recreational vehicles and vans, the rail mechanism is mounted on a seat pedestal to support the occupant at a higher level and provide an improved field of vision from the vehicle.

FIG. 1 illustrates a prior art automotive seat assembly 10 including a seat frame 16 having a seat back 18 and a seat pan 20 interconnected by a recliner 22. The recliner 22 allows the seat back 18 to recline or pivot with respect to the seat pan 20. The seat assembly 10 also includes a rail mechanism 14 supported upon a seat pedestal 12. The recliner 22 and seat pan 20 are secured directly, to the rail mechanism 14.

One trend focusing increased attention on seat strength is the concept of "integral restraint systems" or "all belts to seat." In these systems, the seat belts are secured to the seat assembly rather than to the vehicle floor pan, body pillar, or other structural member. These constructions facilitate assembly of the vehicle. However, in case of vehicle collision, these systems must bear higher forces than conventional systems—especially in the seat back area, which supports the shoulder belt. These forces are translated to the rail mechanism 14 and the pedestal 12. If the impact is sufficient, one of two undesirable consequences may result. First, the recliner 22 may separate from the rail mechanism 14. Second, the rail mechanism 14 may separate from the pedestal 12. Either case results in inadequate occupant support and therefore presents an increased risk of injury.

SUMMARY OF THE INVENTION

The aforementioned problems are overcome by the present invention which provides a recliner interlock securing the recliner to the rail mechanism and/or the seat pedestal. Retainer flanges on the recliner and the rail or pedestal slidingly interfit to reduce the likelihood that the seat recliner will break away from the rail mechanism and/or the seat pedestal.

More specifically, the recliner interlock includes a J-shaped retainer secured to and opening upwardly from the recliner and a J-shaped track secured to and opening downwardly from the pedestal. The retainer and track slidingly interfit with one another. As the seat is moved forward or backward, the retainer travels within the track so that the recliner is continually interlocked with the pedestal.

The present invention provides a simple and effective apparatus for locking the recliner directly to the rail assembly and/or the pedestal while allowing unrestricted movement of the seat. The recliner interlock reinforces the seat assembly thereby reducing the likelihood of the recliner separating from the remainder of the seat assembly during a collision. Further, the recliner interlock transmits the load directly to the floor through the pedestal possibly saving the rail mechanism during a collision. The recliner interlock also provides additional strength for cantilevered recliner arrangements thereby allowing a wide seat back to be mounted on a narrow seat adjuster.

These and other objects, advantages, and features of the invention will be more readily understood and appreciated by reference to the detailed description of the preferred embodiment and the drawings.

BRIEF DESCRIPTION OF THE DRAWINGS

FIG. 4 is a sectional view of the left side of the seat assembly taken along line IV—IV in FIG. 2, the right side being a mirror image thereof;

FIG. 5 is a perspective view of the recliner retainer;

FIG. 6 is a perspective view of the pedestal track; and

DETAILED DESCRIPTION OF THE PREFERRED EMBODIMENT

Figure 1:
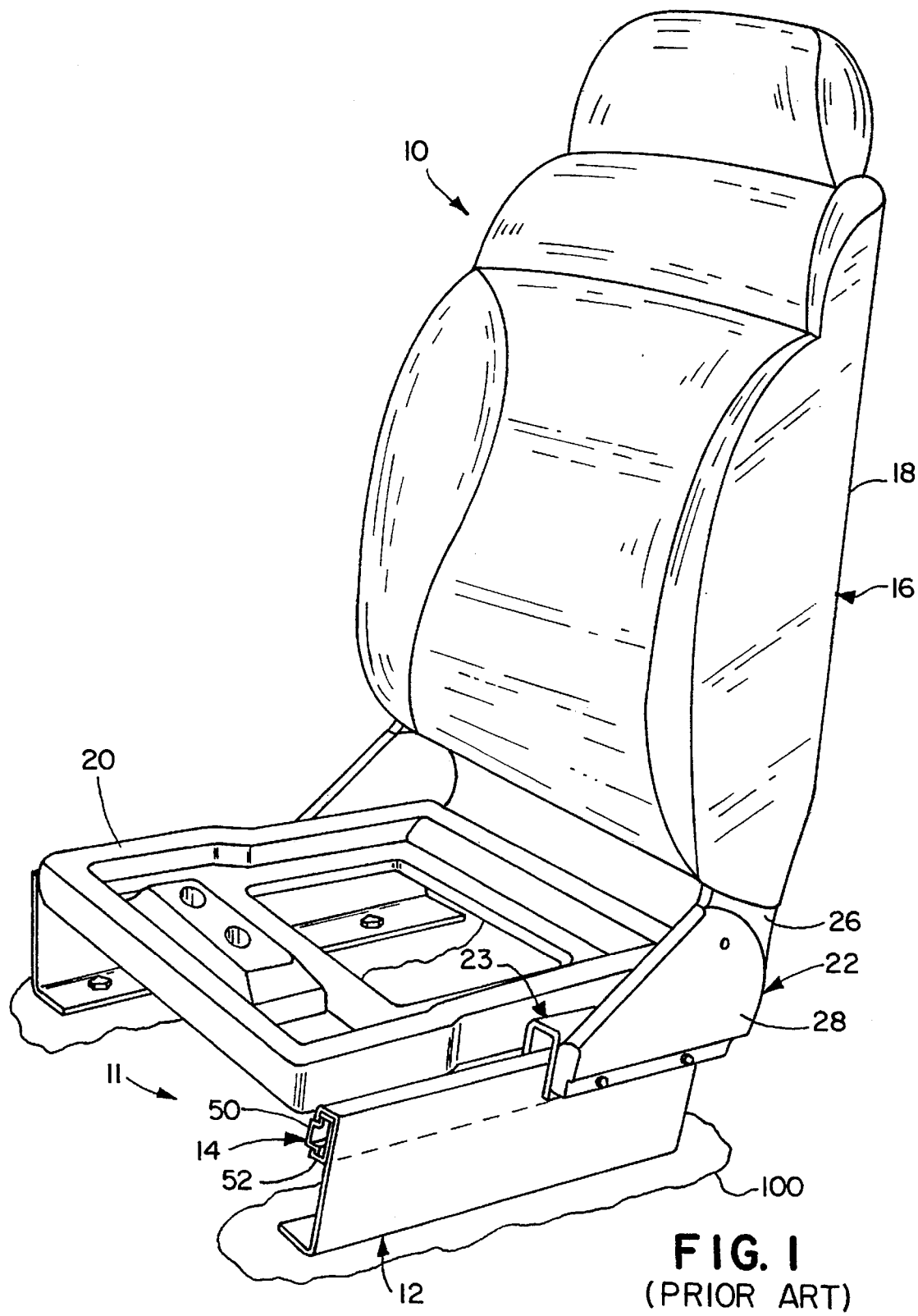
FIG. 1 is a perspective view of a prior art automotive seat assembly.
Figure 2:
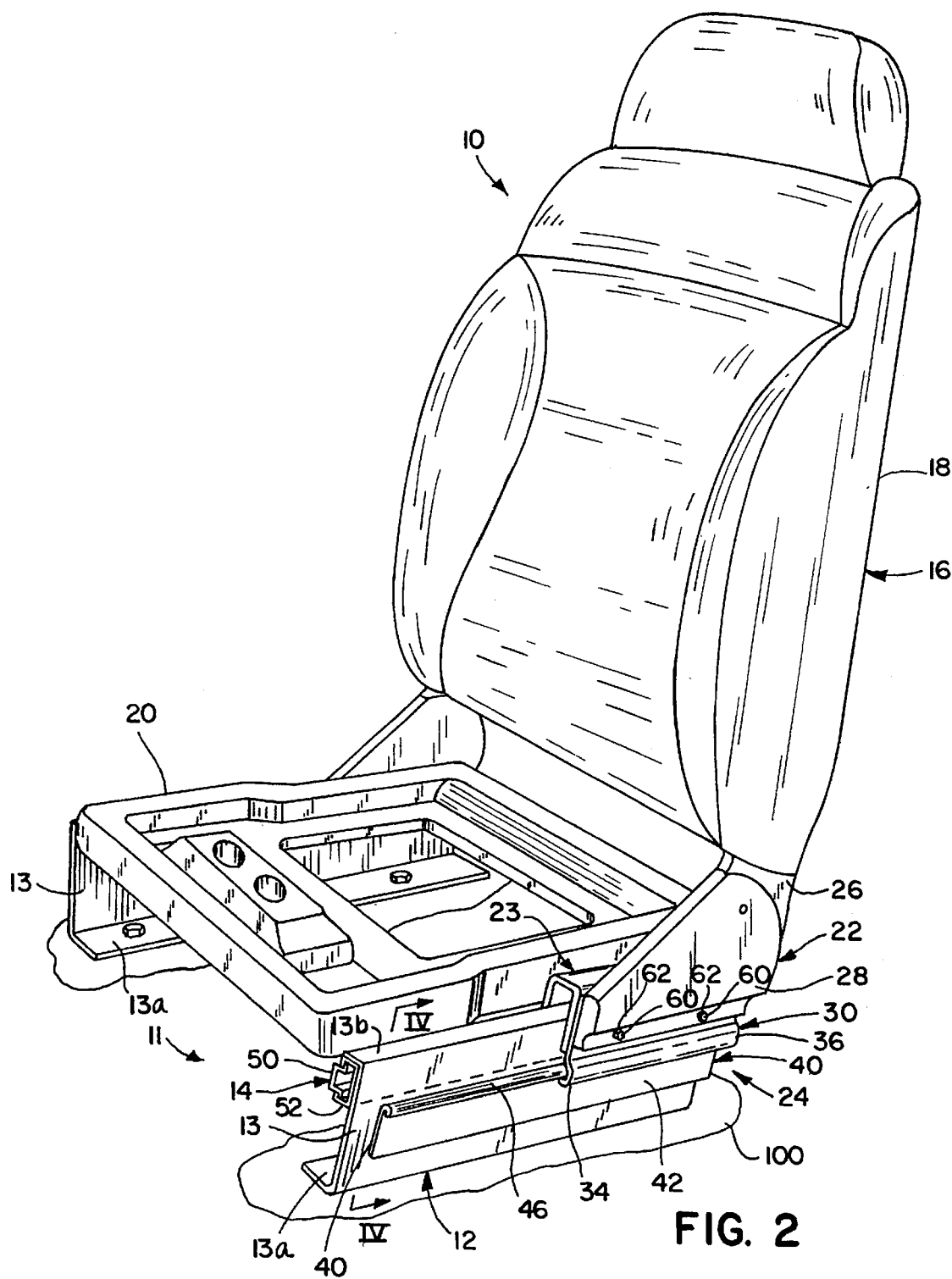
FIG. 2 is a perspective view of an automotive seat assembly having a recliner interlock according to the present invention.

An automotive seat assembly having a recliner interlock constructed in accordance to a preferred embodiment of the invention is illustrated in FIG. 2 and generally designated 10. The seat assembly 10 includes a support assembly 11 having a pedestal 12 and a rail mechanism 14, a seat frame 16, a recliner 22, and a recliner interlock 24 securing the recliner 22 to the pedestal 12. With the exception of the recliner interlock 24, the components of the seat assembly 10 are generally well known to those skilled in the art and consequently will not be described in detail.

In a preferred embodiment, pedestal 12 is a locking pedestal that wraps over the rail mechanism 14 to reduce the likelihood of the seat separating from the pedestal 12 during a collision. The pedestal 12 is described in detail in U.S. patent application Ser. No. 08/519,452 filed on even date herewith by the inventors of the present invention. That application is incorporated herein by reference. The pedestal 12 generally includes a pair of spaced apart sidewalls 13. A lower flange 13a extends inwardly from the bottom of each sidewall. The lower flanges are secured to the floor 100 of the vehicle by welding, bolts, or other conventional fasteners. An upper flange 13b extends inwardly from the top of each sidewall 13. The upper flange 13b extends over the rail mechanism 14. Alternatively, locking pedestal 12 can be replaced by a conventional pedestal (not shown).

The rail mechanism 14 preferably includes telescopically interfitted inner and outer rails 50 and 52 respectively. The inner rail 50 slides freely within the outer rail 52 to allow the seat frame 16 to move forward and backward with respect to the pedestal 12. As shown in FIG. 4, the recliner bracket 23 is preferably mounted directly to the inner rail 50 so that the seat frame 16 and recliner 22 move with the inner rail as the seat is adjusted.

The seat frame 16 generally includes a seat pan 20 and seat back 18. The seat back 18 reclines with respect to the seat pan 20. Optionally, seat actuators or drive motors are mounted to the frame 16 to adjust seat height, seat angle, recliner angle, lumbar support, and the like. While only the seat back 18 is shown upholstered, both the seat back 18 and seat pan 20 would be upholstered prior to use according to well known techniques. Suitable springs, supports, seating cushions, upholstery, and/or fabric would be installed to provide a finished seat.

The recliner 22 pivotally connects the seat back 18 to the seat pan 20. The recliner 22 generally includes upper and lower arms 26 and 28 that are pivotally interconnected by a conventional pivot arrangement. The upper arm 26 is secured to the seat back 18 and the lower arm 28 is secured to the rail mechanism 14 by an inverted U-shaped recliner bracket 23 (See FIG. 4). The recliner bracket 23 fits over the rail mechanism 14 and preferably includes a pair of threaded studs 60 welded thereto. The studs extend through openings in the lower arm 26 and are fit with nuts 62 that secure the recliner 22 to the recliner bracket 23. Alternatively, the recliner 22 can be secured to the recliner bracket 23 by welding, bolts, or other conventional fasteners. The recliner bracket 23 is secured to inner rail 50 by bolts 64 or other conventional fasteners. Optionally, the recliner bracket 23 and retainer 30 (described below) can be integrated into a single component (not shown).

Figure 3:
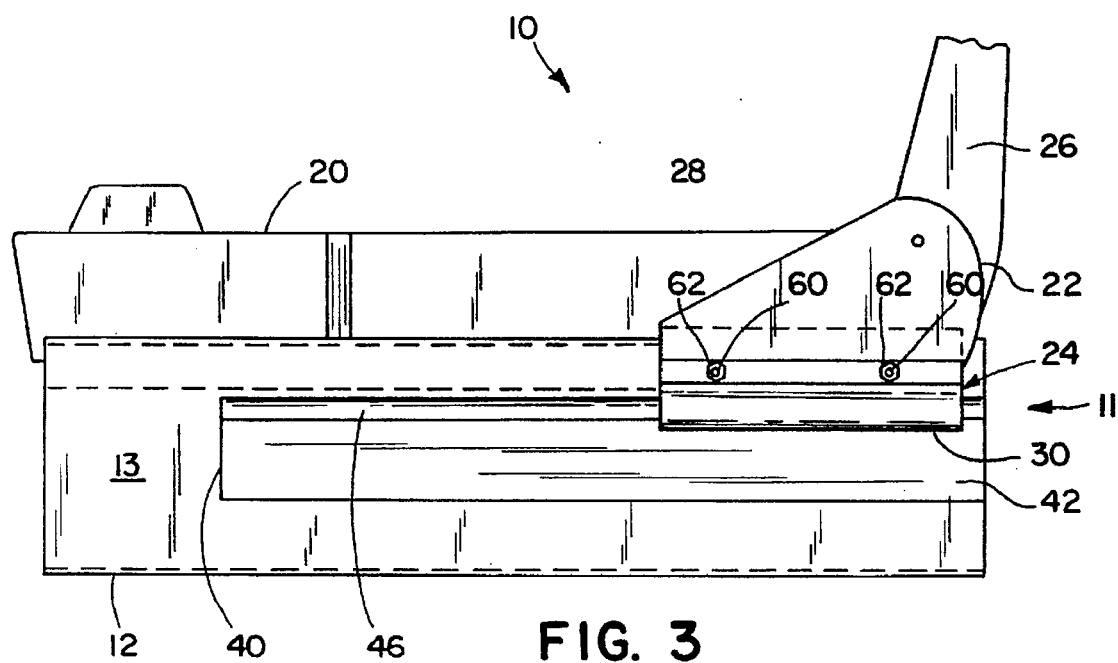
FIG. 3 is a side elevational view of the seat assembly.

The interlock 24 secures the recliner 22 to the pedestal 12. The interlock includes a retainer 30 secured to the recliner 22 and a track 40 mounted to and extending along the pedestal 12. As perhaps best illustrated in FIG. 4, the retainer 30 is generally J-shaped in cross section and includes support flange 32 sandwiched between the recliner 22 and the recliner bracket 23. A generally U-shaped trough 34 extends along a lower portion 36 of the retainer to form a hook located within the track 40. An angled offset portion 37 interconnects the support flange 32 and the trough 34 to properly position the trough with respect the track 40. The angle and length of the offset portion 37 will depend on the desired lateral position of the trough 34. Preferably, the retainer 30 extends the full length of the lower recliner arm 28 (see FIG. 3) to maximize the interlock area between the retainer 30 and the track 40. A pair of mounting holes 33 extend through the retainer 30 to fit over studs 60.

The track 40 is secured to the pedestal 12 and interfits with the retainer 30 (see FIGS. 2 and 4). The track 40 (FIG. 6) is generally J-shaped in cross section and extends along the sidewall 13 of the pedestal. The track 40 includes a generally planar support portion 42 secured directly to sidewall 13, preferably by welding. An inverted, generally U-shaped trough 46 extends along an upper portion 44 of the track 40. The trough 46 interfits with the trough 34 of retainer 30 to interlock the recliner and pedestal. When the seat is moved forward or backward, the retainer 30 travels along the track 40. The track 40 is preferably arranged to remain interfitted with the retainer 30 throughout the entire range of motion of the seat. While the interlock is illustrated and described as attached to the pedestal, the interlock can also be attached to the rail mechanism, whether or not the pedestal is present.

The presently preferred material for the retainer 30 and the track 40 is approximately 3 millimeter, 80 KSI steel. Alternative gauges and materials will be appropriate depending on the requirements of the particular seating application.

The recliner interlock may be factory installed or retrofitted to existing seat assemblies. To install the interlock 24, the recliner retainer 30 is sandwiched between the recliner 22 and the recliner bracket 23, and the track 40 is mounted to the pedestal 12 by welding, bolts, or other conventional fasteners.

Alternative Embodiment

Figure 7:
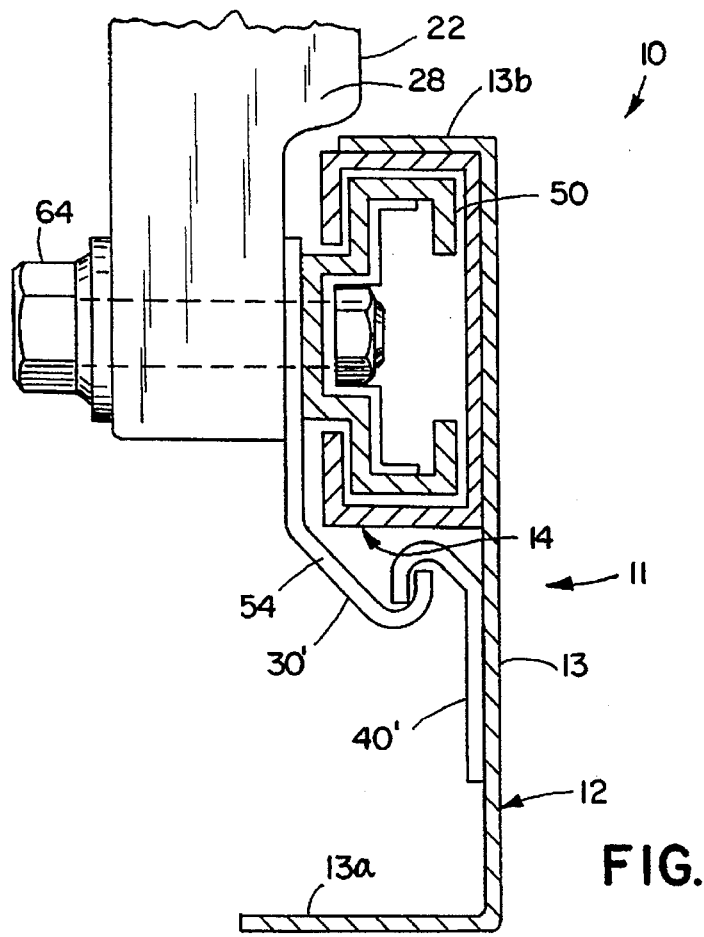
FIG. 7 is a sectional view similar to FIG. 4 of the left side of an alternative recliner interlock for a recliner inside of the rail assembly.

In an alternative embodiment (FIG. 7) 10', the present invention is adapted for use with a seat assembly in which the recliner is mounted to the inside of the rail mechanism. Referring now to FIG. 7, the recliner bracket 23 is eliminated and the recliner 22 and recliner retainer 30' are mounted inside the rail mechanism 14 to inner rail 50. Similarly, the track 40' is mounted to the inside of sidewall 13 to interfit with the retainer 30'. In this embodiment, the retainer 30' and track 40' are very similar to the retainer 30 and track 40 disclosed in connection with the preferred embodiment. However, the retainer 30' preferably includes a web portion 54 to span the horizontal distance between the recliner 22 and the sidewall 13 of the pedestal 12. The length and angle of web portion 54 will vary depending on the width of the rail mechanism 14 and the design of the pedestal 12. Alternatively, this horizontal distance can be overcome by shaping the track 40' or both the retainer 30' and the track 40' to bridge the distance.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An automotive seat recliner interlock, comprising:
   a seat frame including a seat pan, a back frame, and a recliner supporting said back frame on said seat pan;
   a supporting assembly for supporting said seat frame for forward and backward movement, said supporting assembly including a rail mechanism, said rail mechanism including a fixed rail and a moveable rail; and
   an interlock means secured to both said recliner and said supporting assembly for mechanically interlocking said recliner with said supporting assembly, said interlock means including first and second pieces secured to said recliner and said supporting assembly respectively, but said second piece not directly secured to the fixed rail of said rail mechanism.

2. The interlock of claim 1 wherein said first and second pieces are slidably interfitted with one another.

3. The interlock of claim 2 wherein said interlock means includes a retainer J-shaped in cross section secured to said recliner.

4. The interlock of claim 3 wherein said interlock means includes a pedestal track J-shaped in cross section secured to said supporting assembly, said pedestal track and said recliner retainer being interfitted.

5. The interlock of claim 4 wherein said pedestal track and said recliner retainer are slidably interfitted.

6. The interlock of claim 5 wherein said pedestal track and said recliner retainer remain interfitted throughout a range of relative movement between said recliner and said supporting assembly.

7. An automotive vehicle seat, comprising:
   a pedestal;
   a seat having a seat back, a seat pan, and a rail mechanism including a fixed rail and a moveable rail, said seat secured to pedestal and including a recliner for allowing said seat back to recline with respect to said seat pan; and
   an interlock means for interconnecting said recliner and said pedestal, said interlock means includes a retainer secured to said recliner and a track secured to said pedestal but said track not directly secured to the fixed rail of said rail mechanism.

8. The seat of claim 7 wherein said retainer interlocks with said track.

9. The seat of claim 8 wherein said recliner retainer is a J-shaped channel having a bend portion.

10. The seat of claim 9 wherein said pedestal track is an inverted J-shaped channel having a bend portion, said bend portions of said pedestal track and said recliner retainer being interfitted to secure said recliner to said pedestal.

11. The seat of claim 10 wherein said pedestal track and said recliner retainer are slidably interfitted.

12. The seat of claim 11 wherein said recliner is movable with respect to said pedestal; and wherein said pedestal track and said recliner retainer remain interfitted when said recliner moves with respect to said pedestal.

13. An improved automotive vehicle seat assembly having a base assembly including a pedestal and a rail mechanism including a fixed rail and a moveable rail mounted on said pedestal, a seat frame supported by said rail mechanism, said seat frame having a seat pan and seat back interconnected by a recliner, wherein the improvement comprises an interlock comprising:

a retainer connected to said recliner; and a track connected to said pedestal but said track not directly connected to said fixed rail of said rail mechanism, said retainer and said track cooperating to secure said recliner to said pedestal.

14. The seat assembly of claim 13 wherein said retainer is interfitted with said track.

15. The seat assembly of claim 13 wherein said retainer and said track each include a bend, said bends being interfitted to interconnect said retainer and said track.

16. The seat assembly of claim 15 wherein said track and said retainer are slidably interfitted.

17. The seat assembly of claim 16 wherein said recliner is movable with respect to said pedestal; and wherein said track and said retainer remain interfitted when said recliner moves with respect to said pedestal.

* * * * *